United States Patent [19]

Miyama et al.

[11] Patent Number: 5,000,150

[45] Date of Patent: Mar. 19, 1991

[54] METHOD FOR CONTROLLING IGNITION TIMING OF AN INTERNAL COMBUSTION ENGINE

[75] Inventors: Shuji Miyama, Musashimurayama; Hiroya Ohkumo, Musashino, both of Japan

[73] Assignee: Fuji Jukogyo Kabushiki Kaisha, Tokyo, Japan

[21] Appl. No.: 512,654

[22] Filed: Apr. 20, 1990

[30] Foreign Application Priority Data

May 18, 1989 [JP] Japan .................................. 1-125131

[51] Int. Cl.⁵ .............................................. F02P 5/14
[52] U.S. Cl. .................................... 123/425; 123/417; 364/431.08
[58] Field of Search ............... 123/416, 417, 425, 435; 364/431.05, 431.08

[56] References Cited

U.S. PATENT DOCUMENTS

| | | | |
|---|---|---|---|
| 4,620,518 | 11/1986 | Nagai | 123/435 X |
| 4,640,249 | 2/1987 | Kawamura et al. | 123/425 |
| 4,694,801 | 9/1987 | Nagai | 123/435 X |
| 4,725,955 | 2/1988 | Kobayashi et al. | 123/417 X |
| 4,726,339 | 2/1988 | Nagai | 123/425 |
| 4,729,358 | 3/1988 | Morita et al. | 123/425 X |
| 4,736,723 | 4/1988 | Nagai | 123/425 |
| 4,819,171 | 4/1989 | Morita | 364/431.08 |
| 4,903,210 | 2/1990 | Akasu | 364/431.08 |

FOREIGN PATENT DOCUMENTS

| | | | |
|---|---|---|---|
| 0080045 | 4/1988 | Japan | 123/425 |
| 0113157 | 5/1988 | Japan | 123/425 |
| 0003267 | 1/1989 | Japan | 123/425 |
| 0142267 | 6/1989 | Japan | 123/425 |

Primary Examiner—Willis R. Wolfe
Attorney, Agent, or Firm—Martin A. Farber

[57] ABSTRACT

An ignition controlling system has a memory storing a plurality of basic ignition timings each of which is a maximum timing for producing maximum torque with low-octane gasoline without causing knocking, and storing a plurality of maximum advance quantities. A learning control system has a memory storing a plurality of learning correcting quantities and rewriting the learning correcting quantity in accordance with occurrence of knocking of the engine. A basic ignition timing, a maximum advance quantity and a learning correcting quantity are derived from the memories in accordance with engine operating conditions. The learning correcting quantity is compared with the maximum advance quantity and smaller one is selected. The smaller quantity is added to the basic ignition timing to obtain an ignition timing.

5 Claims, 9 Drawing Sheets

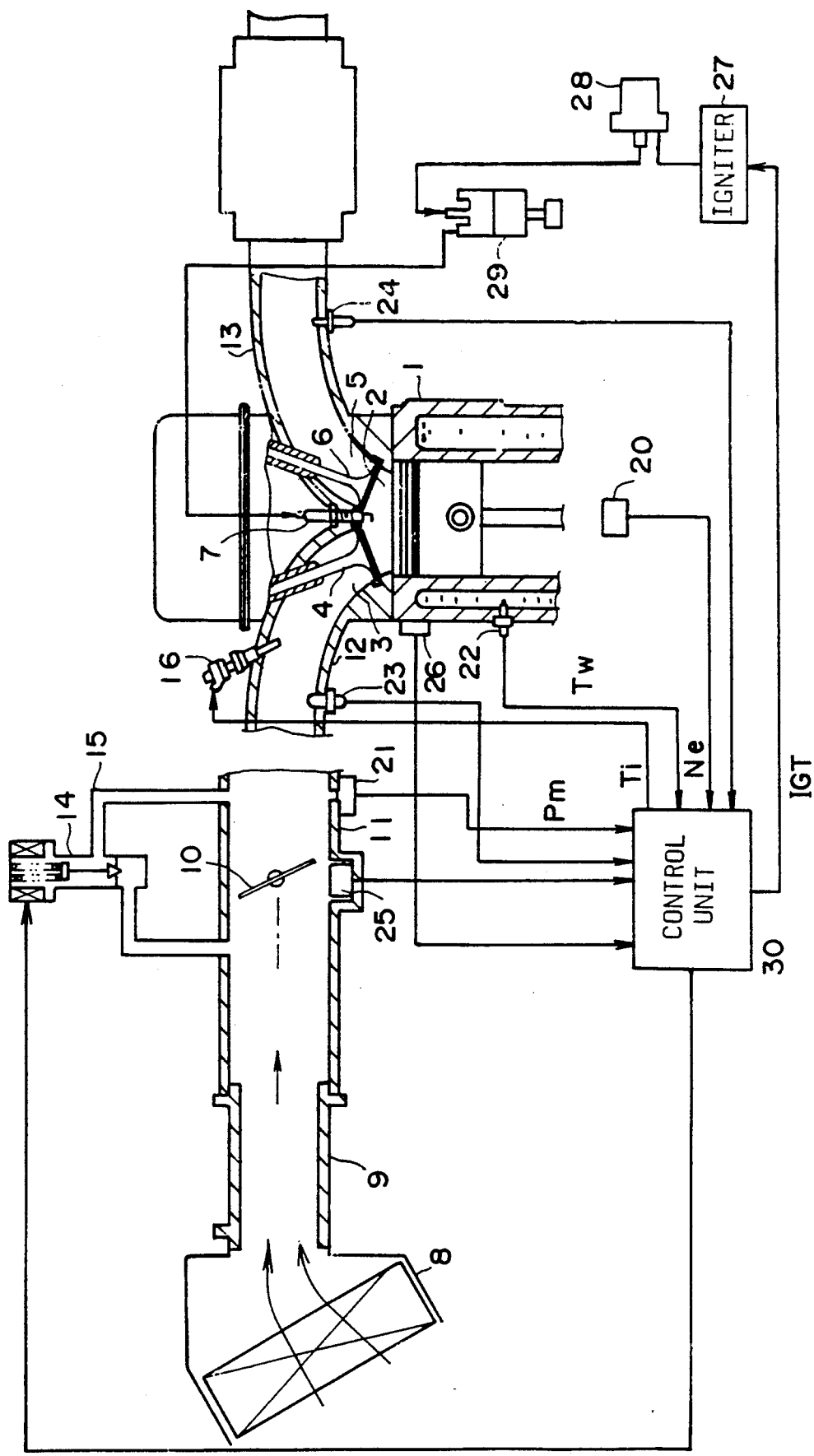

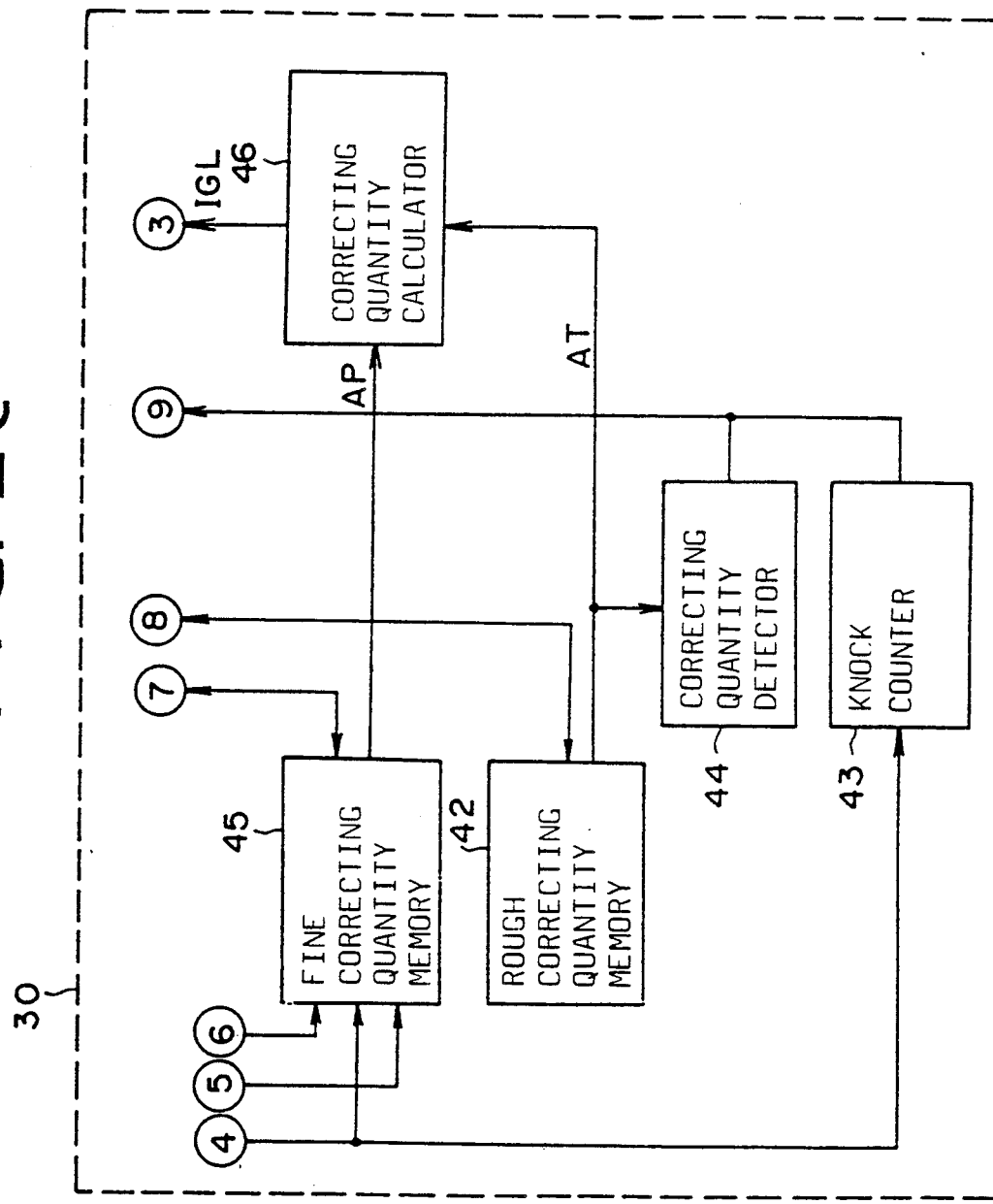

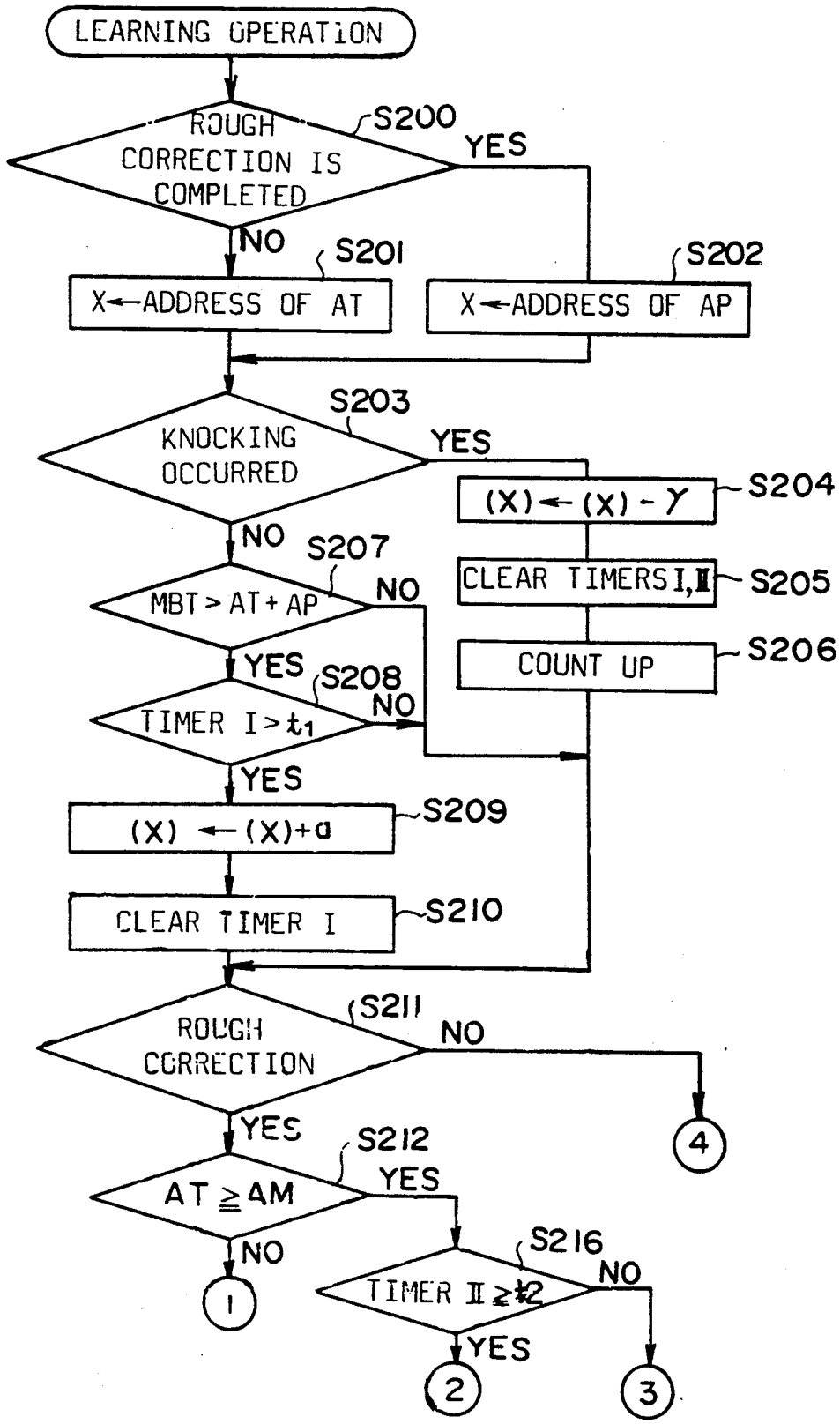

METHOD FOR CONTROLLING IGNITION TIMING OF AN INTERNAL COMBUSTION ENGINE

BACKGROUND OF THE INVENTION

The present invention relates to a method for controlling ignition timing of an internal combustion engine for an automobile.

A learning control system for correcting the ignition timing has been proposed. The control system is adapted to advance the ignition timing so as to produce a maximum torque as long as a level of an engine knock does not exceed a tolerable level. If the knock occurs, the control system operates to retard the ignition timing by a predetermined value. A maximum ignition timing for producing the maximum torque without causing the knock due to changing a type of the engine or octane number of fuel used in the engine. Namely, when high-octane gasoline is mixed with low-octane gasoline, the ignition timing must be more advanced than that of the low-octane gasoline for increasing the torque. Since the octane number varies with the quality of the fuel, it is necessary to correct the ignition timing through a learning control system.

The maximum ignition timing is advanced as the octane number of the fuel increases. However, it is not advisable to advance the timing in accordance with an increase of the octane number, and to exceed a limit ignition timing only for producing the maximum torque dependent on engine operating conditions because the torque is reduced.

Japanese Patent Application Laid-Open 61-157768 (U.S. Pat. No. 4,736,723) discloses a learning control system for the ignition timing control. In the system, a memory storing maximum ignition timings and basic ignition timings is provided, arranged in accordance with engine speed and intake passage pressure. The difference between maximum ignition timing and a basic ignition timing derived from the memory is calculated. A correcting value is obtained by multiplying the difference by a coefficient. The ignition timing is obtained by adding the correcting value to the basic ignition timing. However, the calculated ignition timing does not coincide with a theoretically desired maximum timing. For example, in a low engine speed range the timing is advanced from the desired maximum timing, and in a high engine speed range the timing is retarded. Consequently, the ignition timing is not properly controlled so as to produce a maximum torque with selected fuel.

SUMMARY OF THE INVENTION

The object of the present invention is to provide a method which may correct the ignition timing so as to converge real ignition timing to a desired maximum ignition timing without causing knocking and fluctuation of the correcting value.

According to the present invention, there is provided a method for controlling ignition timing of an internal combustion engine having an ignition timing control system with a memory storing a plurality of basic ignition timings each of which is maximum timing for producing maximum torque with low-octane gasoline without causing knocking, and storing a plurality of maximum advance quantities, and a learning control system having a memory storing a plurality of learning correcting quantities and rewriting the learning correcting quantity in accordance with occurrence of knocking of the engine.

The method comprises the step of, deriving a basic ignition timing, a maximum quantity, and a learning correcting quantity in accordance with engine operating conditions, comparing the derived learning correcting quantity with the derived maximum quantity for determining a smaller quantity, adding the smaller quantity to basic ignition timing to obtain an optimum ignition timing.

In an aspect of the invention, the learning correcting quantity is obtained by adding a rough correcting quantity and a fine correcting quantity.

The learning correcting quantity is obtained by roughly correcting an initial learning correcting quantity with the rough correcting quantity, and by finely correcting the learning correcting quantity with the fine correcting quantity.

The present invention further provides a system for controlling ignition timing of an internal combustion engine having, an ignition timing control system with a first memory storing a plurality of basic ignition timings and a plurality of maximum advance quantities, said timing being a maximum timing for producing maximum torque with low-octane gasoline without causing knocking, and a learning control system with a second memory for storing a plurality of learning correcting quantities and for rewriting the learning correcting quantity in accordance with an occurrence of knocking of the engine, the improvement of the system which comprises means for deriving said basic ignition timing, said maximum advance quantity, and said learning correcting quantity from the first and second memories in accordance with engine operating conditions, comparing means for comparing the learning correcting quantity with the maximum advance quantity for determining a smaller quantity and means for adding the smaller quantity to the basic ignition timing to obtain an ignition timing.

The other objects and features of this invention will become understood from the following description with reference to the accompanying drawings.

BRIEF DESCRIPTION OF THE DRAWINGS

FIG. 1 is a schematic illustration of an engine to which the present invention is applied;

FIGS. 2a to 2c shows a block diagram of a control system according to the present invention;

FIGS. 3a, 3b, 4a and 4b are flowcharts showing an operation of the system; and

DETAILED DESCRIPTION OF THE PREFERRED EMBODIMENT

Figure 2A:
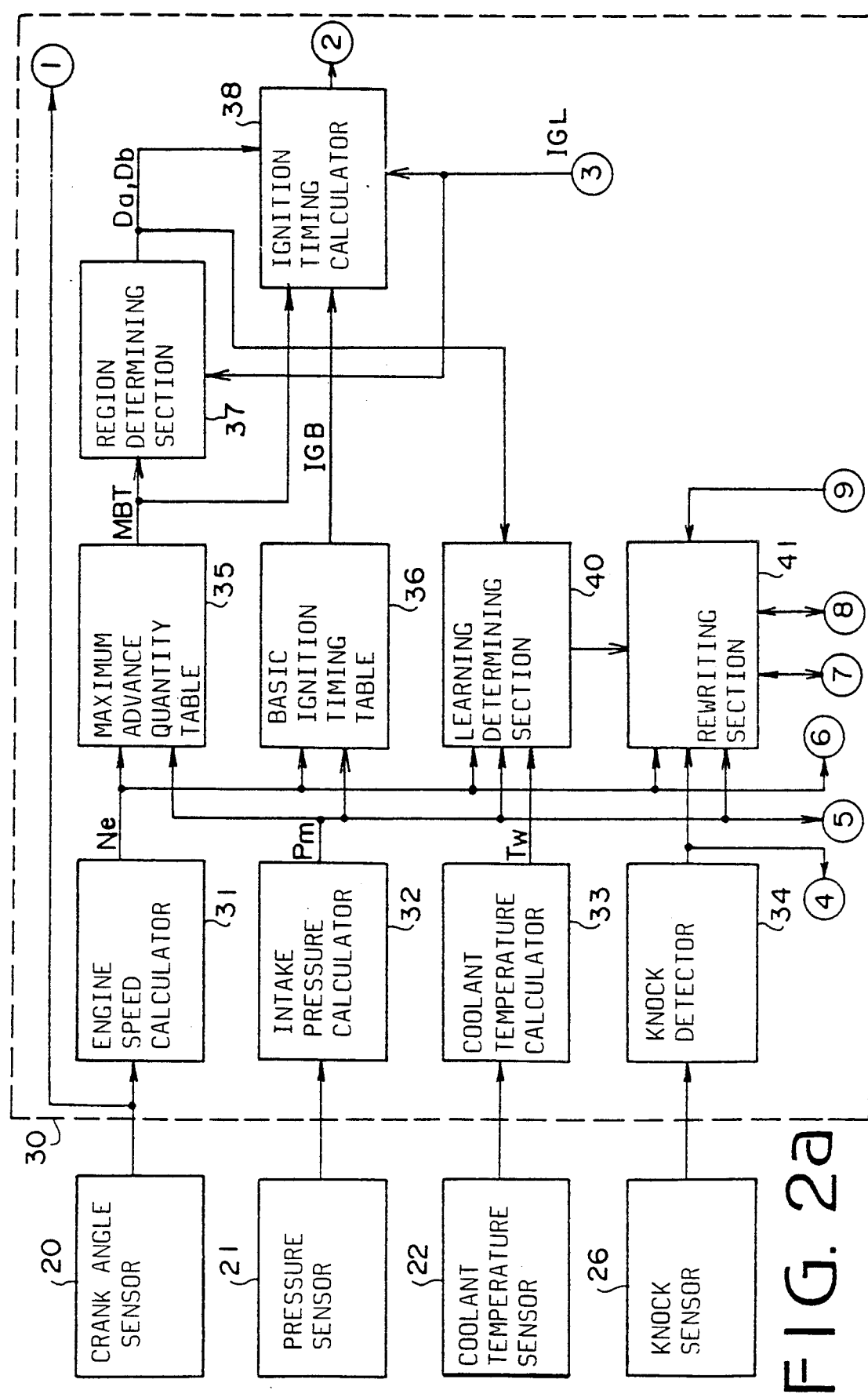
Figure 2B:
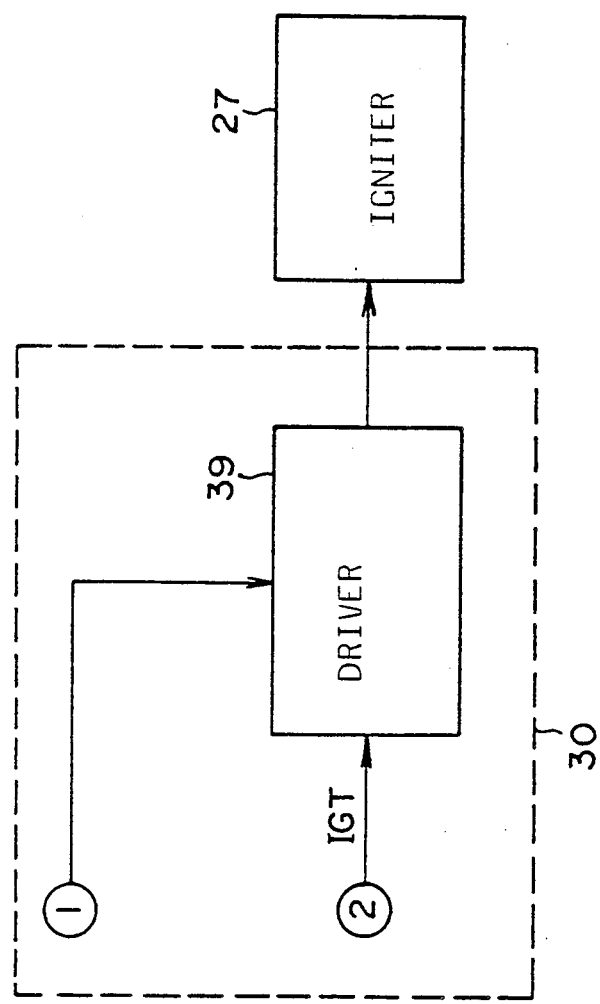

Referring to FIG. 1, an engine 1 has a throttle valve 10 provided in a throttle body 11 communicated with an air cleaner 8 through an intake pipe 9. The throttle body 11 is communicated with an intake manifold 12 which is communicated with a combustion chamber 2 of each cylinder in the engine 1 through an intake port 3 and an intake valve 4. A bypass 15 having an idle speed control (ISC) valve 14 is provided on the throttle valve 10. A spark plug 7 is located in each combustion chamber 2 and a multiple-point fuel injector 16 is provided in the intake manifold 12 adjacent each intake port 3. Exhaust gases of the engine 1 are discharged through an exhaust port 5, an exhaust valve 6 and an exhaust manifold 13. The engine 1 is provided with a crank angle sensor 20, a pressure sensor 21 for detecting pressure in the intake pipe 11 downstream of the throttle valve 10, a coolant temperature sensor 22, an intake air temperature sensor 23, an $O_2$-sensor 24 for detecting oxygen concentration of the exhaust gases in the exhaust manifold 13, a throttle position sensor 25 and a knock sensor 26. Output signals of the sensors from 20 to 26 are applied to a control unit 30 which applies a fuel injection signal to the injector 16, an idle signal to the ISC valve 14 and an ignition signal to the spark plug 7 through an igniter 27, an ignition coil 28 and a distributor 29. Engine speed Ne is calculated based on a crank angle signal from the crank angle sensor 20 and an intake pressure Pm is calculated based on the signal from the pressure sensor 21, which are used for calculating a basic injection pulse width Tp. The basic injection pulse width Tp is corrected in accordance with a coolant temperature Tw from the coolant temperature sensor 22, an intake air temperature Ta from the intake air temperature sensor 23 and a feedback signal from the $O_2$-sensor 24. The fuel injector 16 injects a quantity of fuel which corresponds to a corrected injection pulse width Ti.

On the other hand, it is determined that the engine 1 is idling in accordance with a throttle opening degree detected by the throttle position sensor 25, or with the idle signal of an idle switch. An opening degree of the ISC valve 14 is adjusted to control the engine idling speed.

Referring to FIGS. 2a and 2c, the control unit 30 has an engine speed calculator 31, an intake pressure calculator 32 and a coolant temperature calculator 32 for calculating the engine speed Ne, the intake pressure Pm and the coolant temperature Tw based on output signals of the crank angle sensor 20, the pressure sensor 21 and the coolant temperature sensor 22, respectively. A knock detector 34 is provided to produce a knock signal when the knock sensor 26 detects a knocking of the engine.

Figure 5:
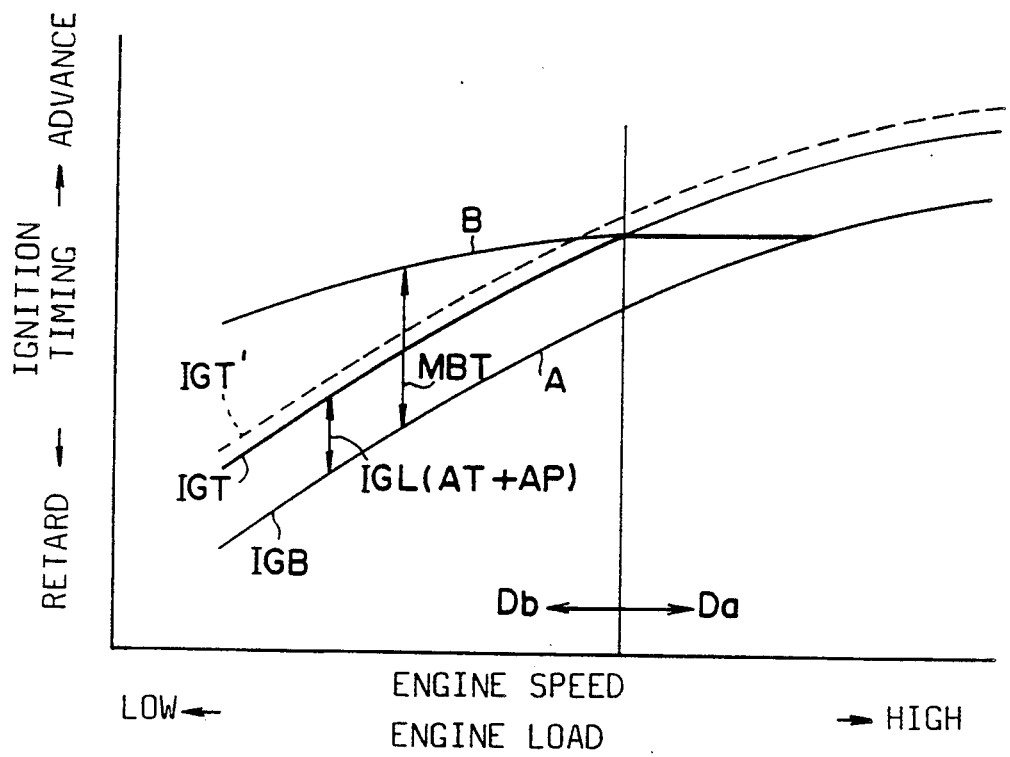
FIG. 5 is a graph showing characteristics of ignition timing and advance quantity in accordance with engine speed and engine load.

The engine speed Ne and the intake pressure Pm are fed to a basic ignition timing look-up table 36 and a maximum advance quantity look-up table 35. The basic ignition timing table 36 stores a plurality of basic ignition timings IGB, arranged in accordance with the engine speed Ne and the intake air pressure Pm. The basic ignition timing IGB is a maximum timing for producing maximum torque with low-octane gasoline without causing the knocking. The basic timing IGB advances with an increase of the engine speed Ne and the increase of the engine load represented by the intake air pressure Pm as shown in FIG. 5. The maximum advance quantity table 35 stores a plurality of maximum advance quantities MBT, arranged in accordance with the engine speed Ne and the intake pressure Pm. The maximum advance quantity MBT is a value to be added to the basic ignition timing IGB to obtain the maximum torque with high-octane gasoline without causing knocking. As shown in FIG. 5, a line representing the maximum advance quantity MBT is shifted from a line A to a line B as the octane number becomes high, so as to advance the basic ignition timing IGB. A theoretically desired maximum ignition timing IGT' for obtaining the maximum torque is parallely shifted in advancing direction with an increase in the octane number of the fuel.

The maximum advance quantity MBT and a learning correcting quantity IGL obtained through the learning procedure, the operation of which will be later described, are fed to a region determining section 37. In the determining section 37, the maximum advance quantity MBT and the learning correcting quantity IGL are compared with one another to select one of regions Da and Db shown in FIG. 5. When the maximum advance quantity MBT is smaller than the correcting quantity IGL (MBT≦IGL), the region Da is selected, where the maximum advance quantity MBT is used for obtaining an ignition timing IGT. To the contrary, when the maximum advance quantity MBT is larger than the learning correcting quantity IGL (MBT>IGL), the region Db is selected, where the correcting quantity IGL is derived.

The output signal of the region determining section 37, the maximum advance quantity MBT and the basic ignition timing IGB and the learning correcting quantity IGL are fed to an ignition timing calculator 38. When the region Db is selected, the learning correcting quantity IGL is derived to advance the basic ignition timing IGB. The ignition timing IGT is calculated as follows.

$$IGT = IGB + IGL$$

On the other hand, in the region Da, the basic ignition timing IGB is advanced by the maximum advance quantity MBT so that the ignition timing IGT is calculated as follows.

$$IGT = IGB + MBT$$

The ignition timing IGT is applied to the igniter 27 through a driver 39 so as to ignite the spark plug 7 at the calculated timing IGT in accordance with the crank angle signal.

The control unit 30 further has a system for obtaining the learning correcting quantity IGL through learning. A learning determining section 40 is applied with the output signal of the region determining section 37, the engine speed Ne, the intake pressure Pm and the coolant temperature Tw to determine whether the engine operating conditions are proper for performing the learning operation. The learning operation is executed when the vehicle is driven after enough warming up in a high engine load range and low engine speed range where the knocking can be accurately detected, and when the Db range is selected. The output signal of the determining section 40 is applied to a rewriting section 41 to which the engine speed Ne, the intake pressure Pm and the knock signal are further fed. The rewriting section 41 selectively performs a rough correcting operation and a fine correcting operation in accordance with the engine operating conditions. A rough learning correcting quantity AT is retrieved from a rough correcting quantity memory 42 and rewritten dependent on the knock signal from the knock detector 34 so that the real ignition timing IGT approximates the desired maximum timing IGT' dependent on the octane number of the fuel. When the knocking does not occur, the learning is performed once every predetermined period t1, for example, 1 second, to increase the rough learning correcting quantity AT by a predetermined value a, thereby changing the rough learning correcting quantity AT in the advance direction. On the other hand, the correcting quantity AT is decreased by a predetermined value γ at every time when the knocking occurs. A knock counter 43 is fed with the knock signal to count occurrences of the knocking. When the knocking counts up to a predetermined number α, for example 5 times, the knock counter 43 produces an output signal which is applied to the rewriting section 41. A correcting quantity detector 44 is fed with the correcting quantity AT to compare the quantity with a predetermined maximum advance quantity AM. When the correcting quantity AT reaches the maximum advance quantity AM, a signal is fed to the rewriting section 41. The rewriting section 41 stops rough corrections when either of the signals from the counter 43 or the detector 44 is fed, and estimates that the ignition timing IGT has approached the desired maximum timing IGT'.

A fine correcting operation is carried out thereafter. A fine learning correcting quantity AP is read out from a fine correcting quantity memory 45 storing a plurality of the fine learning correcting quantities AP which are arranged in accordance with the engine operating conditions. The fine learning correcting quantity AP is similarly increased or decreased by learning in the rewriting section 41 in dependency on the occurrence of the knocking. Thus, the ignition timing IGT is further advanced or retarded to approach the desired maximum timing IGT'.

The rough learning correcting quantity AT and the fine learning correcting quantity AP which are rewritten and stored in the memories 42 and 45, respectively, are fed to a correcting quantity calculator 46 where the learning correcting quantity IGL is calculated as follows.

$$IGL = AT + AP$$

The learning correcting quantity IGL is fed to the ignition timing calculator 38 as described hereinbefore.

Figure 3A:
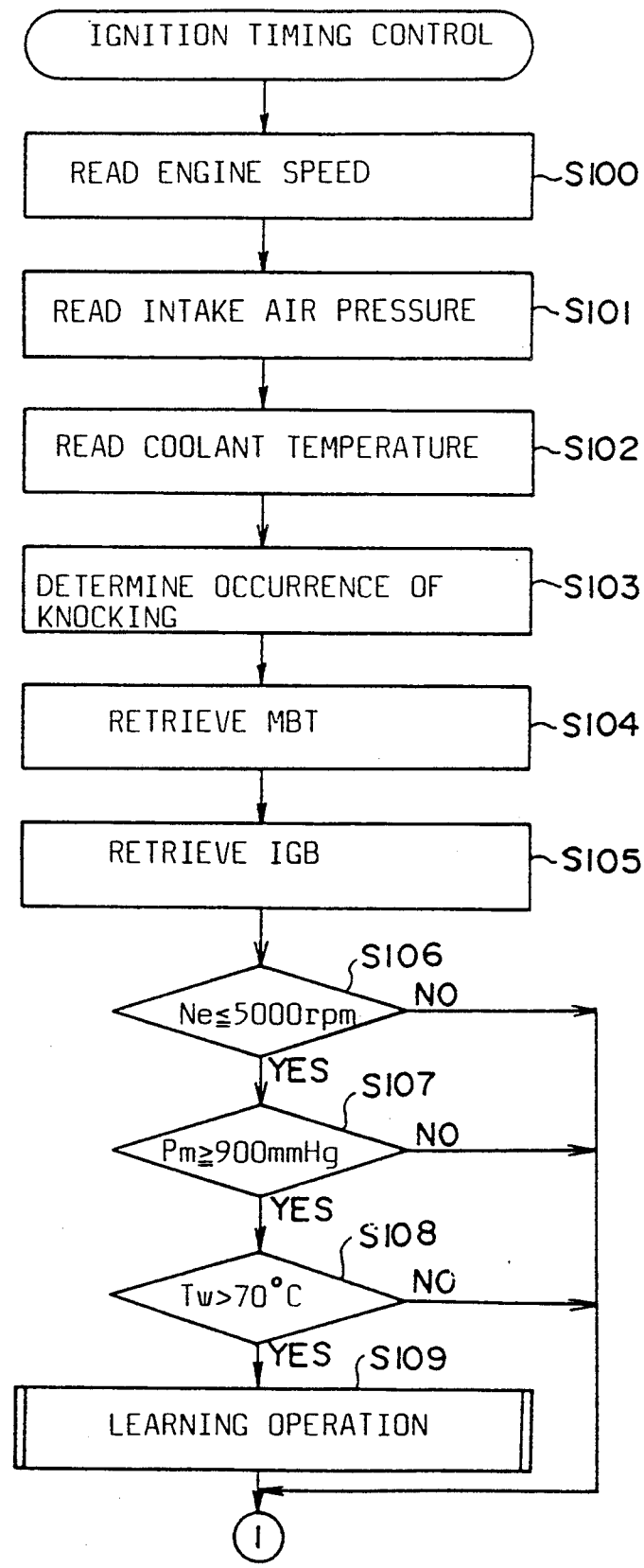
Figure 3B:
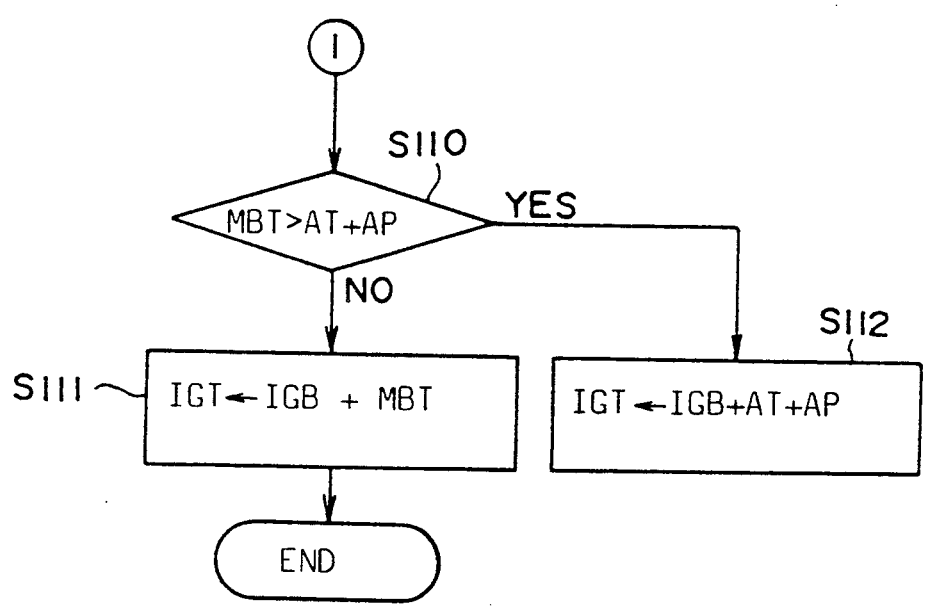
Figure 4B:
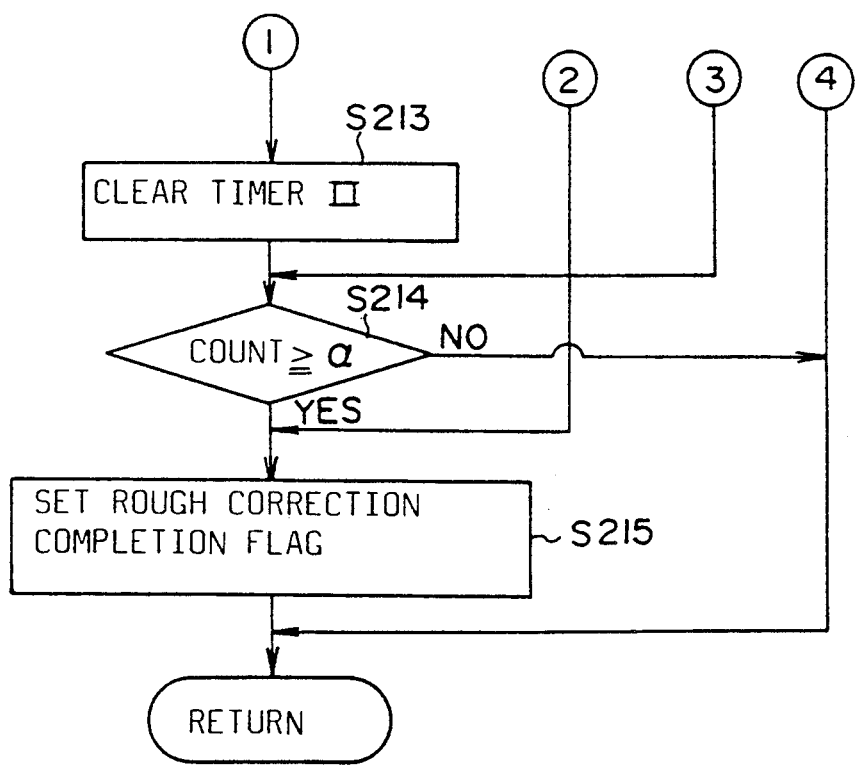

FIGS. 3a and 3b show the operation of the system in summary. When the program starts, the engine speed Ne, the intake air pressure Pm and the coolant temperature Tw are read out at steps S100 to S102. At a step S103, the occurrence of the knock is detected. Thereafter, at steps S104 and S105, the maximum advance quantity MBT and the basic ignition timing IGB are read out from the respective tables 35 and 36 in accordance with the engine speed Ne and the intake air pressure Pm. Steps S106 to S108 determine whether conditions for the learning are fulfilled. More particularly, improper conditions for learning, such as cold engine, or high engine speed range where the knock signal is liable to contain noises or low engine load range where the output of the sensors are low, are omitted at these steps. That is, it is determined whether the engine speed Ne is smaller than 5000 rpm (Ne≦5000 rpm), the intake pressure Pm is higher than 900 mmHg (Pm≧900 mmHg) and whether the coolant temperature Tw is higher than 70° C. (Tw>70° C.). When all of the answers at the steps S106 to S108 are YES, the program goes to a step S109 for the learning operation which is described in FIGS. 4a and 4b.

A step S200 determines whether the rough learning correction is completed. When the rough learning correction is not completed, an address of the rough learning correcting quantity AT in the memory 42 is stored in an index register X at a step S201. The program proceeds to a step S203 where it is determined whether a knock has occurred during the program. When the occurrence of the knock is determined, the program proceeds to a step S204, and if not, proceeds to a step S207. At the step S204, the rough learning correcting quantity AT is decremented by the predetermined correcting quantity γ. Timers I and II are cleared at a step S205 and the counter 43 counts up the occurrence of the knocking at a step S206.

On the other hand, at the step S207, the maximum advance quantity MBT is compared with the learning correcting quantity IGL (AT+AP). When the maximum advance quantity MBT is smaller than the correcting quantity IGL, the learning operation is terminated, since the correcting quantity IGL exceeds the limit advance quantity MBT. At a step S208, the timer I measures a period while the knocking does not occur, and determines whether the engine has operated without causing the knocking for the predetermined period t1 (for example 1 second). If the present time is within the period t1, the learning is not executed. When the knocking has not occurred for the period t1, the correcting quantity AT is incremented by the quantity a at a step S209, and the timer I is cleared at a step S210.

The following steps S211 to S215 are provided for determining the completion of the rough learning correction. At a step S211, it is determined whether the rough correction is still carried out. When the correcting quantity AT is smaller than the predetermined maximum advance quantity AM (step S212), the timer II is cleared at a step S213. At a step S214, it is determined that the rough correction is completed when the knocking has occurred more the predetermined number α (for example 5 occurrences) so that a rough correcting completion flag is set at a step S215.

When the rough learning correcting quantity AT reaches the predetermined maximum quantity AM (step S212), it is determined at a step S216 whether a predetermined period t2, for example 3 seconds, has passed since the rough correction start. The program is repeated to continue the rough correction when the predetermined period has not passed. When the period has passed, the program proceeds to the step S215.

When the rough learning correcting operation is completed, the program goes to a step S202 from the step S200 where an address of the fine correcting quantity AP is stored in the index register X. Thereafter, similar steps from the steps S203 to S210 are carried out. Namely, when one knocking occurs, the fine learning correcting quantity AP is decreased by a predetermined value. To the contrary, when the knocking does not occur, the fine correcting quantity AP is increased to advance the timing. When it is determined at the step S211 that the fine correction is carried out, the program is repeated as long as learning conditions are satisfied.

While the learning operation is performed, the program shown in FIGS. 3a and 3b proceeds to a step S110. At the step S110, it is determined whether the maximum advance quantity MBT is larger than the correcting quantity IGL which is a sum of the rough correcting quantity AT and the fine correcting quantity AP. When the MBT is smaller than IGL (MBT≦IGL), the program goes to a step S111 to calculate the ignition timing IGT by advancing the basic injection timing IGB with the maximum advance quantity MBT. To the contrary, if the MBT is larger than the IGL (MBT>IGL), the ignition timing IGT is determined by advancing the basic timing IGB with the correcting quantity IGL. Thus, the ignition timing IGT close to the desired maximum timing IGT' can be obtained as shown by a bold line in FIG. 5.

In accordance with the present invention, the basic ignition timing IGB is advanced with the correcting quantity AT or AP(IGL) which is obtained through the rough and fine learning operations dependent on the occurrence of the knocking. Therefore, the real maximum ignition timing MBT approaches the desired timing IGT. The correcting quantity IGL is gradually increased or decreased, thereby improving the response of the control system. In addition, in a region where the learning correcting quantity exceeds the maximum advance quantity MBT, the basic ignition timing IGB is advanced by the maximum advance quantity MBT to effectively increase the engine torque.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method for controlling ignition timing of an internal combustion engine having an ignition timing control system with a first memory storing a plurality of basic ignition timings, and a plurality of maximum advance quantities, said timing being a maximum timing for producing maximum torque with low-octane gasoline without causing knocking, and a learning control system having a second memory storing a plurality of learning correcting quantities and rewriting the learning correcting quantity in accordance with occurrence of said knocking of the engine, the method comprising the steps of:

deriving said basic ignition timing, said maximum advance quantity, and said learning correcting quantity from the first and second memories in accordance with engine operating conditions;

comparing the learning correcting quantity with the maximum advance quantity for determining a smaller quantity; and adding the smaller quantity to the basic ignition timing to obtain an ignition timing.

2. The method according to claim 1, wherein
the learning correcting quantity is obtained by adding a rough correcting quantity and a fine correcting quantity.

3. The method according to claim 1, wherein
the rewriting the learning correcting quantity in an advancing direction is stopped when the learning quantity exceeds a predetermined maximum advance quantity.

4. The method according to claim 2, wherein
the learning correcting quantity is obtained by roughly correcting an initial learning correcting quantity with the rough correcting quantity, and by finely correcting the learning correcting quantity with the fine correcting quantity.

5. A system for controlling ignition timing of an internal combustion engine having, an ignition timing control system with a first memory storing a plurality of basic ignition timings and a plurality of maximum advance quantities, said timing being a maximum timing for producing maximum torque with low-octane gasoline without causing knocking, and a learning control system with a second memory for storing a plurality of learning correcting quantities and for rewriting the learning correcting quantity in accordance with an occurrence of knocking of the engine, the improvement of the system which comprises:

means for deriving said basic ignition timing, said maximum advance quantity, and said learning correcting quantity from the first and second memories in accordance with engine operating conditions;

comparing means for comparing the learning correcting quantity with the maximum advance quantity for determining a smaller quantity; and means for adding the smaller quantity to the basic ignition timing to obtain a ignition timing.

* * * * *